(12) United States Patent
Richardson et al.

(10) Patent No.: US 8,573,478 B2
(45) Date of Patent: *Nov. 5, 2013

(54) IMAGE EXCHANGE WITHOUT FULL MICR QUALIFICATION (76) Inventors: Joseph L. Richardson, Germantown, TN (US); Joseph M. Rowell, Memphis, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/838,784

(22) Filed: Jul. 19, 2010

(65) Prior Publication Data

US 2010/0281300 A1    Nov. 4, 2010

Related U.S. Application Data (63) Continuation of application No. 11/381,197, filed on May 2, 2006, now Pat. No. 7,757,938, and a continuation-in-part of application No. 11/156,685, filed on Jun. 20, 2005, now abandoned.

(60) Provisional application No. 60/677,146, filed on May 2, 2005, provisional application No. 60/580,855, filed on Jun. 18, 2004.

(51) Int. Cl.
| G06Q 40/00 | (2012.01) |
| G07D 11/00 | (2006.01) |
| G07F 19/00 | (2006.01) |
| G06K 19/06 | (2006.01) |
| G06K 7/06 | (2006.01) |

(52) U.S. Cl.
USPC ............ 235/379; 235/380; 235/449; 705/39; 705/44; 705/45

(58) Field of Classification Search
USPC ............... 235/487, 380, 493, 379, 375, 449; 382/119, 233; 705/14, 26, 39, 44, 45
See application file for complete search history.

(56) References Cited

U.S. PATENT DOCUMENTS

| 4,066,873 | A  | * | 1/1978  | Schatz ............................ 235/487 |
| 4,172,552 | A  | * | 10/1979 | Case et al. ..................... 235/380 |
| 4,385,285 | A  | * | 5/1983  | Horst et al. .................... 382/119 |
| 4,686,357 | A  | * | 8/1987  | Douno et al. .................. 235/379 |
| 5,479,530 | A  | * | 12/1995 | Nair et al. ...................... 382/119 |
| 6,415,054 | B1 | * | 7/2002  | Silverbrook et al. ......... 382/233 |
| 6,760,470 | B1 | * | 7/2004  | Bogosian et al. ............. 235/380 |
| 6,808,109 | B2 | * | 10/2004 | Page .............................. 235/379 |
| 7,045,394 | B2 | * | 5/2006  | Sato et al. ..................... 438/113 |
| 7,072,868 | B2 | * | 7/2006  | Baxter et al. .................... 705/64 |
| 7,267,264 | B2 | * | 9/2007  | Page .............................. 235/379 |
| 7,384,890 | B2 | * | 6/2008  | Lubrino et al. ................ 503/204 |
| 2003/0088474 | A1 | * | 5/2003 | Hoffman et al. ................ 705/26 |
| 2003/0168510 | A1 | * | 9/2003 | Allen ............................. 235/380 |
| 2004/0117250 | A1 | * | 6/2004 | Lubow et al. ................... 705/14 |

* cited by examiner

*Primary Examiner* — Thien T Mai
(74) *Attorney, Agent, or Firm* — Wayne Edward Ramage; Baker Donelson (57) ABSTRACT

A system and related methods of correcting errors during check or financial document processing by a bank of first deposit or other entity receiving a paper check or financial document, or by a second bank on whose accounts the checks were written. These corrections can be performed by the computer system of the bank of first deposit, the computer system of the second bank, or both. MICR or other data may be sent in electronic format from the bank of first deposit or other entity without qualification.

15 Claims, 5 Drawing Sheets

IMAGE EXCHANGE WITHOUT FULL MICR QUALIFICATION

This application is a continuation of U.S. application Ser. No. 11/381,197, filed May 2, 2006, now U.S. Pat. No. 7,757,938 which claims priority to Provisional Patent Application No. 60/677,146, filed May 2, 2005, now abandoned and which also is a continuation-in part of U.S. application Ser. No. 11/156,685, filed Jun. 20, 2005, which claims priority to Provisional Patent Application No. 60/580,855, filed Jun. 18, 2004, by Joseph L. Richardson, and is entitled to those filing dates for priority in whole or in part. The specification and drawings of Provisional Patent Application Nos. 60/677,146 and 60/580,855, and U.S. application Ser. Nos. 11/156,685 and 11/381,197 are incorporated herein by specific reference in their entireties for all purposes.

FIELD OF INVENTION

This invention relates to automated financial transactions. More particularly, it relates to a system and method for clearing transactions between banks.

BACKGROUND OF INVENTION

"Check processing," as that term is used herein, refers to the process of receiving a check at a first bank (a bank of first deposit, or "BOFD") to be deposited into a first account at that bank (or cashed at that bank), and that is drawn on a second account at a second bank. When received, the BOFD returns the check to the second bank on which it is drawn and requests payment for the check. The second bank then deducts the check amount for the second account, and transfers that amount of money to the BOFD. The BOFD then credits the first account with that amount of money.

A "check" or "checks" as that term is used herein refers to financial documents indicating and authorization to transfer funds from one financial institution or business to another financial institution or business, and includes but is not limited to such things as consumer checks, business checks, traveler's checks, U.S. Treasury checks, money orders, and legal copies of checks such as IRDs or substitute checks.

This process is well known in the art, and has been in use in one form or another for hundreds of years. Until quite recently, the process involved the BOFD actually transmitting the original paper check back to the second bank for examination at the second bank, and waiting a substantial period of time (days, and sometimes weeks) for the second bank to respond either by rejecting the check, or by honoring it and sending the check amount. Over time, the process has become gradually more and more automated with the advent of high speed check processing machines, computer-readable check numbers, and even more recently, computer handwriting recognition.

One of the final bottlenecks and costs to the entire process has been the legal requirement that the check—the actual physical paper document—be returned to the person who originally wrote it. Instead of checks being one-way documents, going from the executor to the recipient, checks have been two-way documents, to be physically tracked, returned and collated by the second bank for return to the executor. This process of gathering and compiling every check across America and placing them in envelopes for return shipment to the executor with his bank statement every month has been quite expensive. Even the cost of returning them from the BOFD to the second bank, let alone gathering them at the second bank for return to the executor, is quite expensive.

For that reason, the Check Clearing for the 21st Century Act, commonly referred to as "Check 21," was enacted in the United States. Signed into law on Oct. 28, 2003, and effective one year later, the new law facilitates the cost efficiencies of check truncation by encouraging image based processing and truncation. Check 21 reduces the unnecessary transfer of checks, and the concomitant cost, by enabling the scanning the checks at the BOFD and performing the remaining processing with an electronic record of the check, which includes an electronic image of the check and an electronic record of the check data (including, but not limited to, the account number, the bank routing number, and the amount of the check). Check 21 is a federal law that supersedes state law, and applies to all types of checks, including, but not limited to, consumer, business, traveler's and U.S. Treasury checks.

It is important to note that Check 21 does not mandate truncation, it merely enables it by mandating that a financial institution accept substitute checks, treat substitute checks as legal equivalents of an original paper check, provide informational notices to consumers, and adopt new expedited re-credit procedures for substitute checks. Check 21 creates a new legal instrument called a "substitute check," which allows financial institutions to truncate the original paper check to process the check information electronically and to deliver substitute checks to financial institutions that want to continue receiving paper checks. Under the Act, a financial institution no longer can demand the original paper check, but instead must accept a substitute check. Because substitute checks can be processed just like original paper checks, a financial institution would not need to invest in new technology or otherwise change its current check processing operations.

"Truncation" is defined as the removal of an original paper check from the collection process. The check information is captured electronically in a data file and the original paper check is destroyed. When a check is truncated, the recipient does not receive their original paper check back.

A "substitute check" is a copy of an original paper check that has all the legal attributes of the original paper check. A substitute check must contain an image of the front and back of the original paper check, bear all the information appearing on the MICR line of the original paper check, conform in material (e.g. paper) stock and dimension, be suitable for automated processing, and contain the words: "This is a legal copy of your check. You can use it the same way you would use the original check." Typically, a substitute check is approximately 3.75"×8.5" in size, contains a leading "4" in the MICR line, and includes an image of the original paper check (front and back) with additional endorsements such as the reconverting bank, bank of first deposit and truncating bank routing numbers and a legal legend. "MICR" refers to the line of numbers near the bottom of a check, which may include the bank routing number, the customer account number, the check number, the amount, and other information, printed in magnetic ink so that the information can be read electronically.

IRD is an acronym for "Image Replacement Document," and is the industry vernacular for "substitute check." "IRD" and "substitute check" are used interchangeably in the industry.

A "reconverting bank" is defined as the financial institution that created the substitute check or the first financial institution that transfers or presents the substitute check for payment.

Check 21 is not the same as image exchange. "Image exchange" is defined as the presenting, receiving and settling of checks between financial institutions by electronically exchanging images and MICR line data of an original paper check. Check 21 is a law that legally establishes "image exchange" as a legally valid check collection process, whereas "image exchange" is the check collection process itself.

By authorizing image exchange, Check 21 promotes and provides numerous advantages in check processing. It accelerates settlement, reduces the volume of physical checks, reduces the number of times a physical check is handled, facilitates rapid discovery of fraud, allows for earlier or multiple transmissions, eliminates resubmits, lowers clearing fees, reduces check floating, improves collections, promotes electronic processing of share draft returns, accelerates receipt and processing of check collection returns, accelerates receipt and processing of check collection returns, enables a potential increase in return check service fee income, reduces the time and expense spent in research and adjustment, reduces transportation and infrastructure costs (e.g., hardware, maintenance, supplies, and labor), reduces check storage expenses, and reduces sorting time due to fewer checks and passes.

Prior to Check 21 and image exchange, financial institutions (such as the BOFD described above) processing transit checks (i.e., checks drawn on another institution) specifically captured, processed and verified only (1) the routing transit number (i.e., the number that uniquely identifies the second bank or institution the check was drawn on), and (2) the dollar amount. This capturing, processing and verifying was and is done by high speed check processing machines.

In some cases, the BOFD also would scan and record other information, such as the account number MICR data. This is unnecessary from a processing point of view, however, since the BOFD merely needs the amount of the check and the identity of the bank on which it was drawn in order to send a request for the amount of money to the second bank. In the latter instance, the second bank would extract and decipher the remaining information on the check. Thus, the second bank would rescan the check to determine who the actual account holder was and using that information, debit the second account for the amount of the check accordingly.

With image exchange, since the original paper checks are disposed of by the BOFD upon receipt and initial scanning under the new system (i.e., the checks are "truncated"), there would be no check to be forwarded to the second bank to be electronically scanned a second time to determine the number of the second account and debit that account accordingly. This scenario potentially presented a tremendous increase in un-posted checks, and/or additional check keying requirements on the part of the financial institution receiving images. No longer could a high speed machine read MICR data printed on checks at the second bank. Unless other arrangements were made by Check 21, individuals at the second bank would need to view the substitute check images on computer screens and manually type in the second account number. In addition to increasing labor costs by requiring additional employees at the second bank, this situation would also have further complicated the goal of detecting, analyzing, and eliminating any possible double posting of check images.

To deal with this problem, Check 21 changed the legal obligations placed on each bank when processing checks. Under Check 21, the bank receiving the check (i.e., the BOFD) must scan the check and extract all the useful information from the check, including the MICR account number on the check before sending the complete record of check data together with the image to the second bank. Thus, tasks previously handled by the second bank which actually had the second account on which the check was drawn (and, presumably, the closest relationship with the account holder) would now be handled by the BOFD.

Accordingly, standards were needed to require all characters of the MICR information be scanned and saved at the BOFD, including serial and account number fields, and mandate that the check's image and full MICR information be transmitted to the second bank. At the present time, the standards most likely to be adopted by image exchange networks include ANSI X9.37 for Electronic Cash Letters, ANSI X9.90 for Image Replacement Documents, and ANSI X9.81 for Future Bulk Image and Data Exchange.

Under the present implementation of the image exchange process, if any of the MICR information on the check is not readable or invalid, the BOFD rejects the check and manually corrects the data to the extent possible. However, if, after completing these manual corrections, some of the MICR data still cannot be determined, the check is not eligible to participate in the image exchange process and the physical check is sent to the other bank or institution it is drawn on in the traditional manner.

Accordingly, what is needed is a method that allows a BOFD to truncate a check and transmit the check's image and MICR data to a second bank, even if all of the check's MICR data cannot be determined and thus would not normally be eligible to participate in the image exchange process.

SUMMARY OF THE INVENTION

The present invention relates to a system and method of improving the image exchange process by allowing a bank of first deposit (BOFD) or other entity receiving a paper check or document with MICR data to truncate the document and transmit the document's image and MICR data to a second bank or entity, even if all of the MICR data cannot be determined and thus would not normally be eligible to participate in the image exchange process. This present invention provides advantages for the sending bank or entity allowing substantially more checks to be truncated and their images and MICR information transmitted to the receiving institution(s).

In one exemplary embodiment, correction of some or all of the MICR data is done automatically. In one embodiment, the error correction method comprises comparing an erroneous number in the MICR data with a plurality of correct numbers and electronically replacing the erroneous number with a number from said plurality of possible correct numbers.

In another exemplary embodiment, the BOFD may truncate all documents, regardless of whether the MICR data has been corrected, and thus send the MICR data and/or images to a receiving institution without qualification. The receiving institution may attempt correction of the data.

DESCRIPTION OF THE DRAWINGS

For a more complete understanding of the present invention and its advantages, reference is now made to the following description taken in conjunction with the accompanying drawings, wherein like numerals represent like parts.

DETAILED DESCRIPTION OF THE INVENTION

The present invention provides for an improvement in the image exchange process that allows a BOFD or other entity or institution receiving a paper check or similar document to truncate a check and transmit the check's image and MICR data to a second bank, even if all of the check's MICR data cannot be determined and thus would not normally be eligible to participate in the image exchange process. In the context of this specification, BOFD thus should be understood to include a bank of first deposit or any other entity or institution receiving a paper check or similar document. This present invention provides advantages for the sending bank (i.e., the BOFD) by allowing substantially more checks to be truncated and their images and MICR information transmitted to the receiving institution(s).

The basic steps of the image exchange process are as follows:

1. A BOFD receives a check from a customer or other entity.
2. The BOFD captures, processes, and verifies the information on the MICR line of the check.
3. If any of the MICR information on the check is not readable or invalid, the BOFD rejects the check and manually corrects the data to the extent possible. However, if, after completing these manual corrections, some of the MICR data still cannot be determined, the check is not eligible to participate in the image exchange process and the physical check is sent to the other bank or institution it is drawn on in the traditional manner.
4. If all of the MICR information on the check can be determined at the BOFD, the check is truncated at the BOFD and the BOFD transmits the check's image and MICR information to the other institution in a file conforming to the applicable standard (currently, the ANSI X9.37 standard).
5. Upon receipt of this data file, the second bank verifies and validates the images and MICR information contained within the data file. Note that even if all of the MICR information is present in the data file and contains no invalid characters, the MICR fields may still contain invalid data for a check (e.g., a closed or non-existing account, an account number that fails a modulus check routine, an out-of-range serial number, and the like)
6. Any check whose information fails validation, along with the check's image from the file, is presented to a data entry person at the second bank for correction.
7. If all of the MICR information is valid, the information is used to post a transaction to the second account.

In one exemplary embodiment of the invention, a BOFD can use error correction methods (such as the system and method described in Richardson, U.S. application Ser. No. 11/156,685) to correct automatically the account number or other fields on the MICR line of the check being processed. In one embodiment, the error correction method comprises comparing an erroneous number in the MICR data with a plurality of correct numbers and electronically replacing the erroneous number with a number from said plurality of possible correct numbers. When the BOFD can extract the check's full MICR information, the check can be truncated and its image and MICR information transmitted to the second bank on a data file conforming to the appropriate standard, such as the ANSI X9.37 standard. This avoids the expense of and issues involved with sending the physical check back for processing to the second bank or entity.

Figure 1:
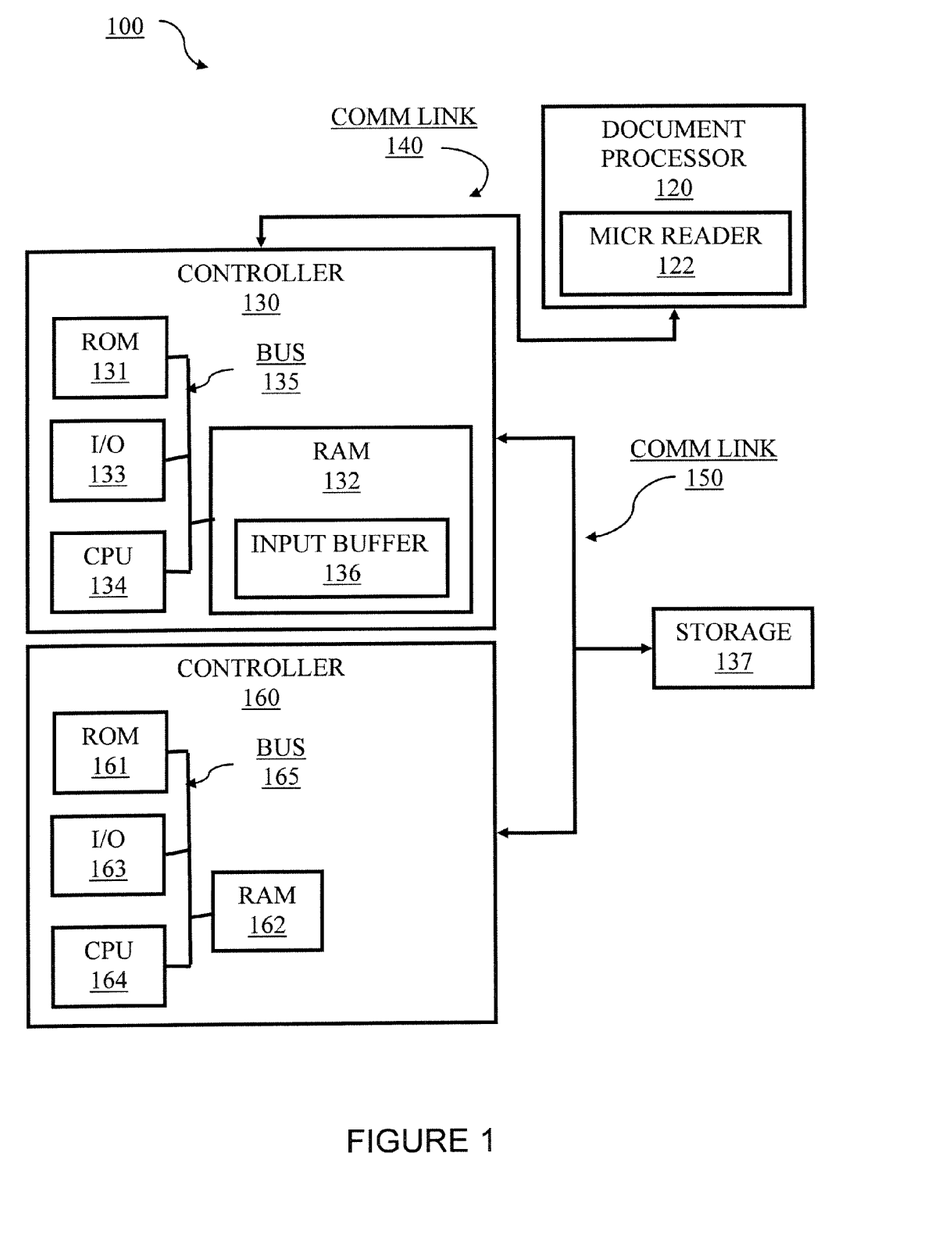
FIG. 1 is a block diagram illustrating a system for processing documents and creating and transmitting data in accordance with one exemplary embodiment of the present invention.

FIG. 1 shows a system 100 for processing documents and creating, transmitting, receiving, and processing data files in accordance with one exemplary embodiment of the present invention. The system 100 comprises a document processor 120 for processing documents for a financial institution or other suitable type of business, a processor controller 130 for controlling the operation of document processor 120, and a file controller 160 for creating and transmitting the data files. Data files may be data files in compliance with the X9.37 standard. The document processor 120 may be any one of a variety of suitable document processors known in the art, such as, but not limited to, the the 77xx and iTran document processors from NCR, the E series and X series image capture hardware from BancTec, the NDP series document processors from Unisys, the 3890 series document processors from IBM, teller systems from Argo, or other, similar document processors.

In one embodiment, the document processor 120 incorporates a MICR reader 122, and may include other components such as, but not limited to, an image scanner (not shown). The MICR reader 122 is operable to retrieve the MICR data from a plurality of documents as they are processed by the document processor 120. A communications link 140 couples the document processor 120 to the processor controller 130. The processor controller 130 may be configured to execute a plurality of computer operating system programs, including, but not limited to, Windows NT, Windows XP, OS/2, Unix, Linux, MVS, and Z/OS. Similarly, the file controller 160 also may be configured to execute a plurality of computer operating systems programs, including those just mentioned with respect to the processor controller 130. The processor controller 130 and the file controller 160 may both execute the same operating system, but this is not required.

In one embodiment, the processor controller 130 may incorporate read-only memory (ROM) 131, random access memory (RAM) 132, an input/output module (I/O) 133, a central processing unit (CPU) 134, and a communication bus (BUS) 135. The controller 130 may be coupled to storage 137, such as, but not limited to, a hard disk drive, CD-ROM, or other digital electronic media. The connection may be via a communications link 150.

Similarly, the file controller 160 also may incorporate read-only memory (ROM) 161, random access memory (RAM) 162, an input/output module (I/O) 163, a central processing unit (CPU) 164, and a communication bus (BUS) 165. The file controller 160 also may be coupled to storage 137, possibly via a communications link 150. The file controller 160 may be coupled to the same storage 137 via the same communications link 150 as the processor controller 130, but each controller may have its own separate storage and link. The communications link(s) 150 may be coupled to a public or private communications network such as WAN, LAN, or the Internet, which provides for the transmission or receipt of data, such as, but not limited to, X9.37 data files, images, and other data.

Figure 2:
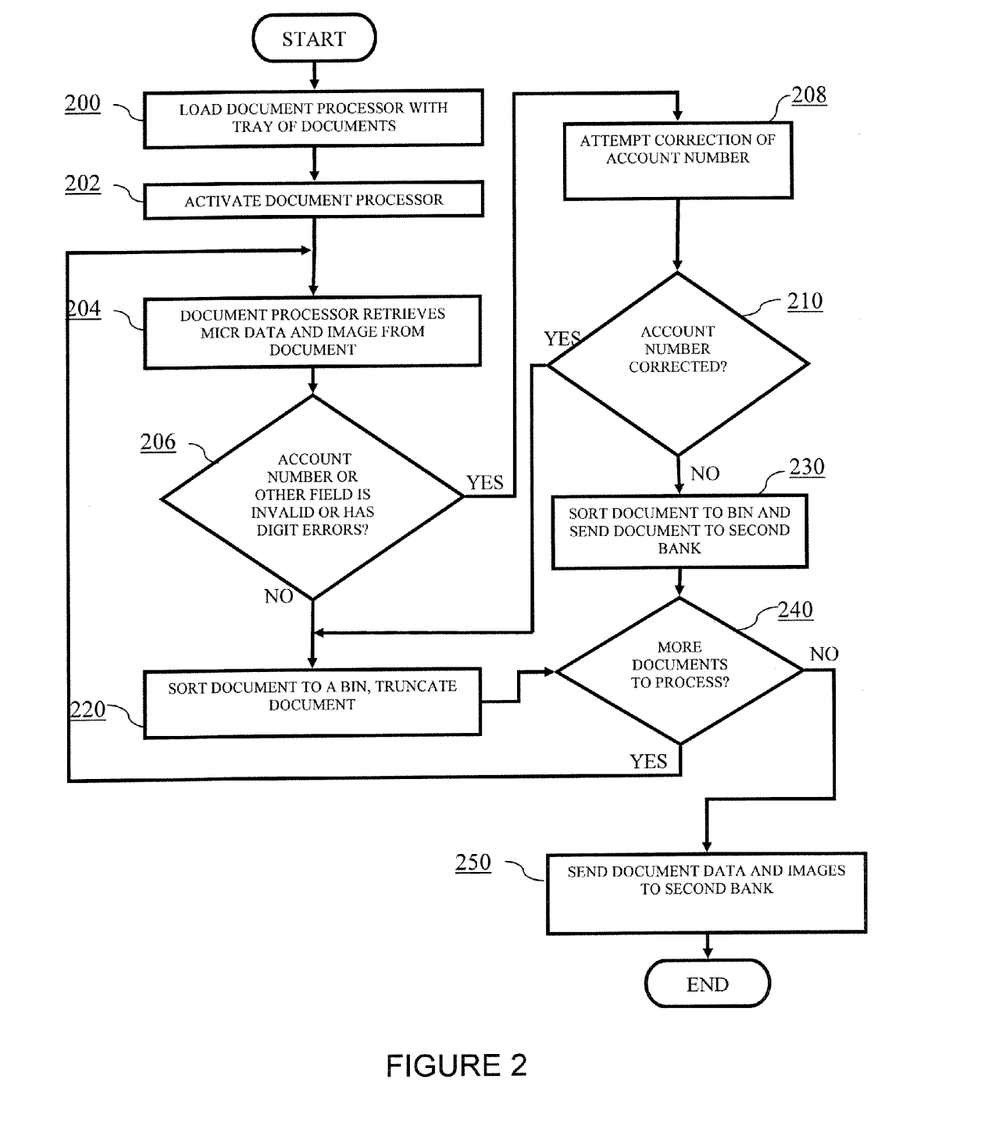
FIG. 2 is a flow diagram illustrating a method of correcting the account number at the sending bank followed by processing in accordance with one exemplary embodiment of the present invention.

FIG. 2 shows one exemplary method of operating a system 100 in accordance with the present invention. First, the document processor 120 is loaded with one or more documents (a plurality of documents is typical) to be processed 200. The document processor 120 then is activated to begin processing documents 202. The document processor 120 retrieves the MICR data and image from the first document of the plurality of documents being processed 204. The document then is examined by the processor controller 130 in accordance with its program logic to determine if any digit errors exist in the account number field or other fields on the document 206.

If errors exist, an attempt is made to correct the account number or other field of the document 208. The account number or other field then is examined to determine if the correction was successful 210. If the correction was not successful, the document is sorted to a bin for documents that will be physically sent to the second bank 230.

If no errors exist 206, or if errors exist but were successfully corrected 210, then the document is sorted to a bin for truncation (i.e., the document will be destroyed) 220.

If there are more documents to process 240, then the next document is loaded and processing proceeds, repeating one or more previous steps. If all documents are processed, the data and images from the truncated documents are transmitted to the second bank 250. The physical documents that were separated in step 230 may be physically sent to the second bank.

In another exemplary embodiment of the current invention, the BOFD continues to process and verify only the routing number and dollar amount on transit checks, just as it would before. The checks are truncated and their images and MICR data are included on the data file, regardless of whether the check's MICR information contains errors in fields other than the routing and amount fields, such as, but not limited to, the serial and account number fields. In other words, the data file being transmitted to the other institution will contain information for checks where the serial and account number fields, among others, of the MICR line contains incorrect data or invalid characters.

Figure 3A:
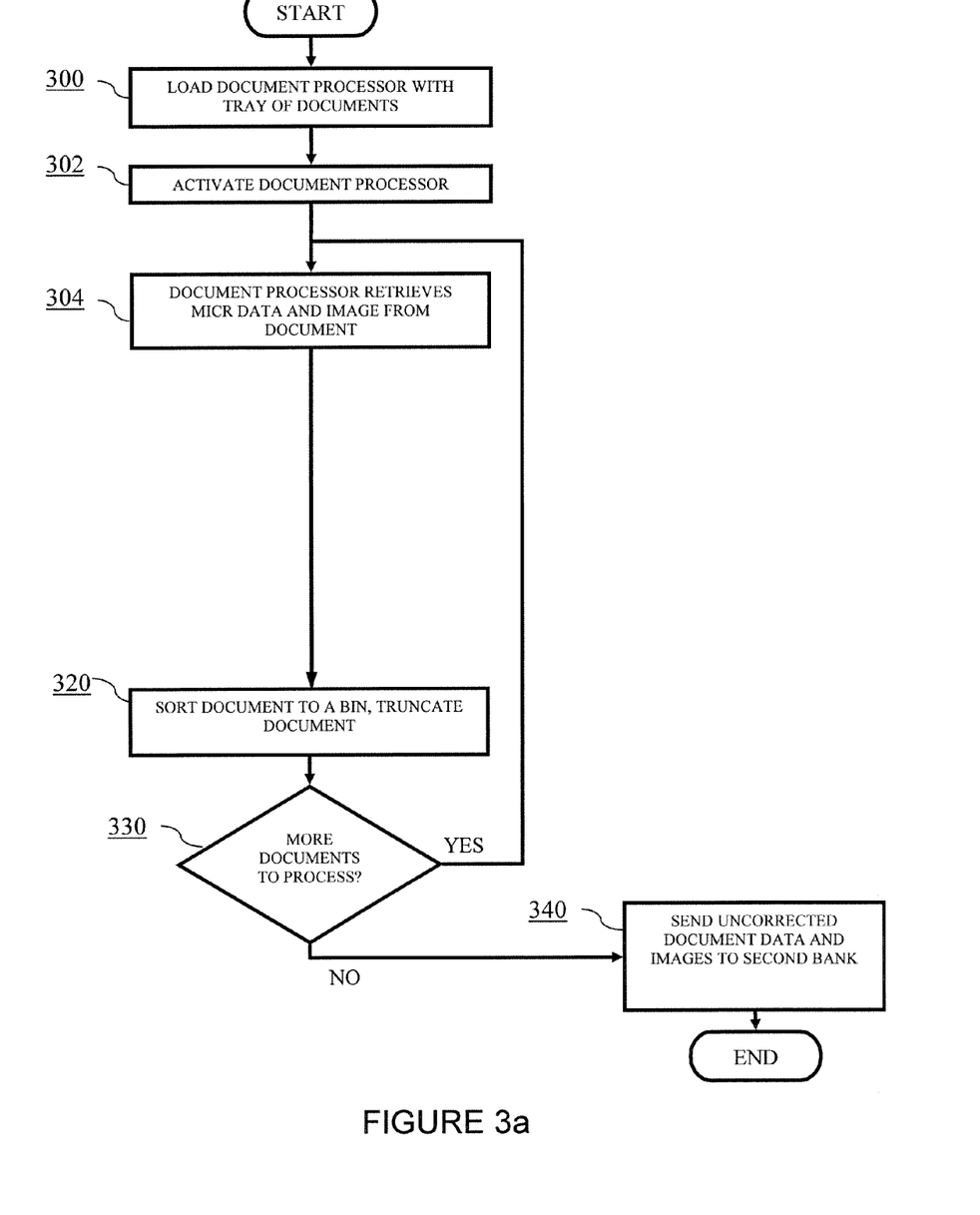
FIGS. 3a and 3b are flow diagrams illustrating a method of not correcting MICR data at the sending bank and transmitting the uncorrected MICR data to the second bank for later processing in accordance with another exemplary embodiment of the present invention.

This process is shown in FIG. 3*a*. First, the document processor 120 is loaded with one or more documents (a plurality of documents is typical) to be processed 300. The document processor 120 then is activated to begin processing documents 302. The document processor 120 retrieves the MICR data and image from the first document of the plurality of documents being processed 304. At this point, regardless of whether errors existed, the document is sorted to a bin for truncation (i.e., the document will be destroyed) 320. If more documents remain to be processed 340, processing continues as shown. If all documents are processed, the data and images from the truncated documents (and all documents are truncated in this method) are transmitted to the second bank 350. That is, the MICR may be sent without qualification.

Figure 3B:
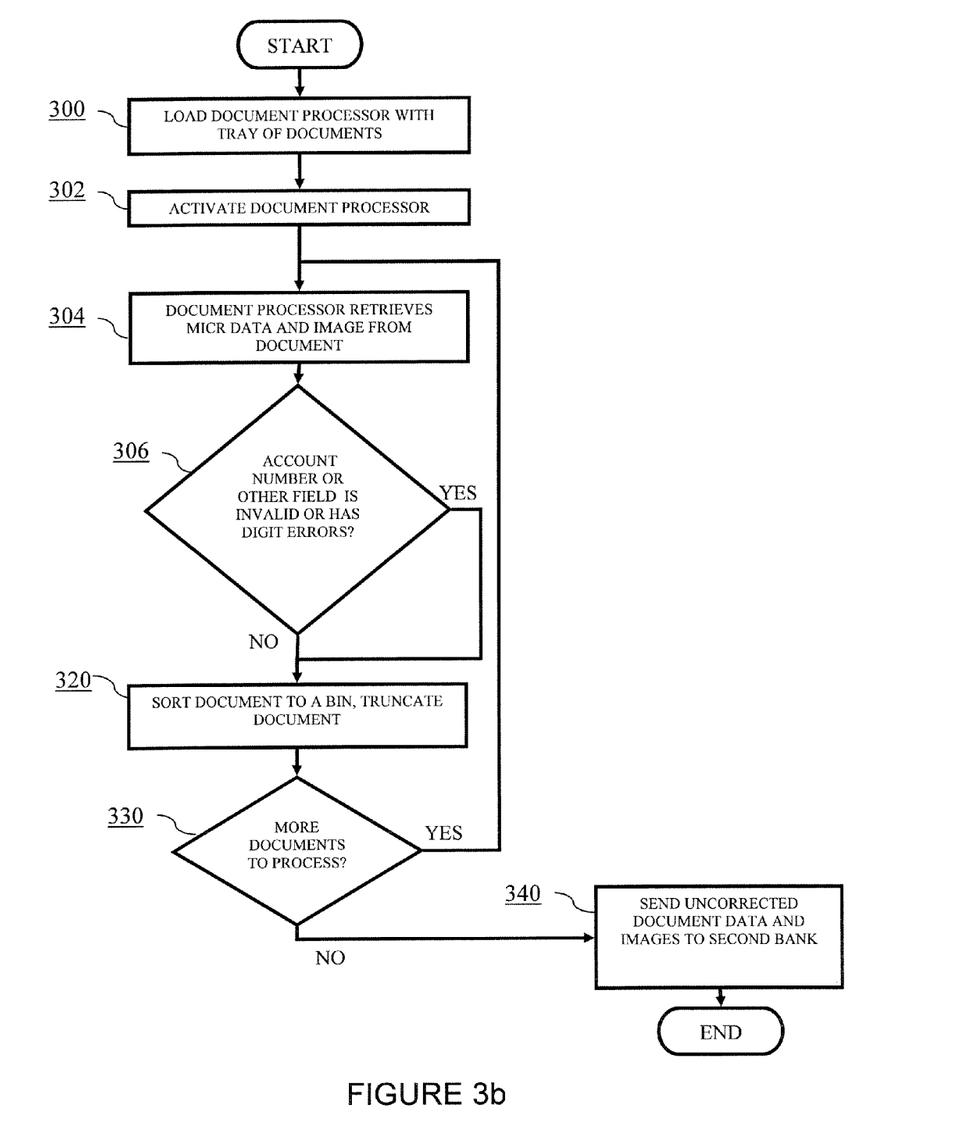

FIG. 3*b* shows a variation of this process with the document examination step included 306. It is readily apparent from FIG. 3*b* that the process may flow from retrieval of data 304 directly to sorting 320 without the account number (or other data) being examined for digit errors 306. However, in another exemplary embodiment, if this step 306 is taken, data with errors can be identified and/or separately transmitted to alert the second institution to the existence of identified erroneous data and facilitate processing thereby.

The institution receiving the data file then takes appropriate steps to determine whether there are any errors and to correct any errors found. In one exemplary embodiment, in order to minimize the number of checks whose MICR information must be manually corrected by a data entry person, the institution receiving the data file containing images and MICR information of checks (such as a X9.37 data file) determines if each data record in the file contains any invalid characters within the MICR information. If any invalid characters are detected in the MICR information, the MICR information may be corrected by various means, such as the system and methods described in Richardson, U.S. application Ser. No. 11/156,685, which is incorporated herein by specific reference. The system and methods therein provide for the automatic (i.e., non-human) correction of approximately 96% of all invalid account number fields. Therefore, the receiving bank or institution will see only approximately 4% of said checks requiring correction by a data entry operator.

Figure 4:
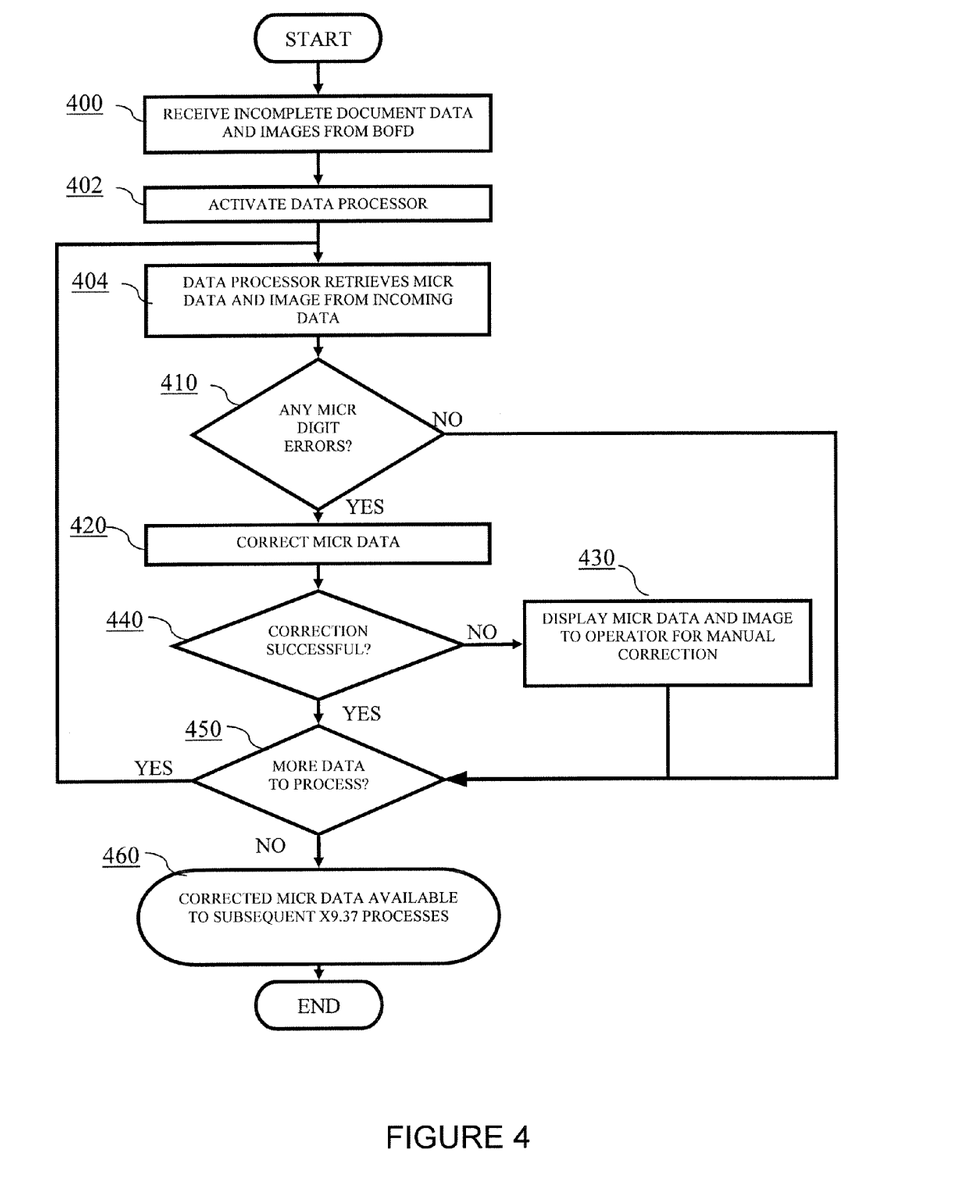
FIG. 4 is a flow diagram illustrating a method for correcting the MICR data at the second bank in accordance with another exemplary embodiment of the present invention.

In yet another exemplary embodiment of the present invention, automatic error correction may be attempted by the receiving institution, regardless of whether error correction has been attempted by the BOFD. FIG. 4 shows one embodiment of a method of operation using the above-described system 100. The receiving bank receives the MICR and image data from the sending bank (i.e., the BOFD) 400. In one embodiment, this data may be identified as incomplete prior to being received. The receiving bank then activates the data processor to begin processing the MICR data received 402. The data processor then retrieves the MICR data from the incoming data 404, and the MICR is examined by the processor controller 130 in accordance with its program logic to determine if any digit errors exist in the account number field or other fields on the document 410.

If errors exist, an attempt is made to correct the account number or other field of the document 420. The account number or other field then is examined to determine if the correction was successful 440. If the correction was not successful, the document data is sent to a data entry operator for manual correction 430.

If no errors exist 410, or if errors exist but were successfully corrected, either automatically 440 or manually 430, then the data becomes available to subsequent processes according to the applicable standard (such as the X9.37 standard) 460. As shown in FIG. 4, there may be a determination of whether there is additional document data to process 450. If so, then one or more of the previous steps are repeated. Eventually, all document data becomes available to subsequent processes. The determination of whether there is additional data to process may precede the release of the data for subsequent processing, so that all data is processed and then released as a batch as the last step. Alternatively, the data can be released for each document individually, while the process repeats for the next document.

In an alternative exemplary embodiment, the receiving bank may correct the MICR data by processing the received data file without using the data processor or document processor 120. The receiving bank receives a file containing invalid or incorrect MICR data, processes the received file to replace the invalid or incorrect MICR data with corrected MICR data, and creates a new data file containing the corrected MICR data. This new data file containing the corrected MICR data is then made available for subsequent processes.

An advantage of this method is that the sending bank can now truncate and transmit images and MICR information for all of the checks that it previously would have sent as physical originals. Prior to image exchange, the BOFD only required a valid routing and amount fields on the MICR information on the check to transport the check to the receiving institution. With the changes described within this embodiment of the current invention, the number of checks eligible for truncation and image exchange does not decrease (due to the requirement that all MICR fields must not contain invalid characters). Absent the current invention, the BOFD would see an increase in the rejected checks the BOFD must correct manually so they could be included in the data file, or at a minimum, there would be some checks (e.g., those with rejected characters in the other fields of the MICR line) for which the BOFD would continue to send physical checks to the receiving institution.

Another advantage to the receiving institution is that more of its checks to be processed are arriving electronically in the data file, rather than arriving as a physical check that must be processed through a document processor (i.e., check scanning). Yet another advantage is that the receiving institution is correcting its own account number fields rather than another institution (i.e., the BOFD) correcting the account number fields. This is desirable since the receiving institution has management and process controls to monitor the quality of the data correction of its own customers' transactions.

Examples of how several basic configurations of these systems and methods in combination are used in conjunction with the ANSI X9.37 standard are described below.

Example 1

Correcting Bank Routing Number at BOFD Followed By Standard ANSI X9.37 Handling

A computer system at the bank of first deposit (BOFD) of the check scans each check electronically, reads the MICR data, and also takes an electronic picture or image of each check itself. The MICR data on checks includes several fields, including (1) amount of the check, (2) process control field, (3) account number, (4) optional field 4, (5) bank routing number, (6) optional field 6, and (7) serial number. Some of these numbers are optional and therefore are not on every check. If these numbers are on the check, however, then under the ANSI X9.37 standard as required by Check 21, they must be supplied in the X9.37 data file that is transmitted to the second or receiving bank.

Once the computer system at the BOFD has scanned the data, it determines whether it has a complete set of all MICR data on the check. Some of the data, such as the check amount, may be entered by hand, or determined by character recognition algorithms programmed into the computer system at the BOFD. The computer system at the BOFD determines whether any of the individual characters comprising the MICR data are missing.

In one embodiment, the computer system at the BOFD determines whether any characters in the bank routing number are missing. If so, the computer system compares the individual characters in the bank routing number that were readable against a master list of bank routing numbers. As discussed in Richardson, U.S. application Ser. No. 11/156, 685, the BOFD computer system may be configured to determine which bank routing numbers among the universe of all valid bank routing numbers match the characters that were scanned correctly. Based upon this comparison, there may be only a single valid bank routing number that matches all of the known correct characters in the bank routing number scanned off the check. If so, the computer system is configured to replace the unknown characters—the characters that were unreadable from the check—with the only possible valid characters determined from the list of all valid bank routing numbers.

Once the computer system at the BOFD has scanned the check and has determined, either directly from the scanned data provided by the check scanner, or by correcting the scanned information (e.g. the bank routing number), that it has a full set of MICR data, the computer system transmits that MICR data, together with the scanned image of the check and the amount of the check (if the amount was not in MICR form) in a data file formatted in proper ANSI X9.37 digital electronic form to the bank identified by the bank routing number.

In an alternative exemplary embodiment, the computer system electronically transmits the MICR data in ANSI X9.37 form (plus the amount) to the second bank in the data file formatted in proper ANSI X9.37 form, but does not transmit the digital image of the check itself. Instead, the BOFD transmits the MICR data and amount in ANSI X9.37 form to the second bank, and transmits the image to a third-party data warehouse, such as, but not limited to, Viewpointe. Instead of embedding the image in the X9.37 data, the BOFD embeds a link to the image in the third-party data warehouse that uniquely identifies the image of the check stored in warehouse.

In another alternative embodiment, the computer system does not transmit the check image in MICR data and amount in proper ANSI X9.37 form directly to the second bank, but transmits it to third-party data warehouse, such as SVPCo, which stores the data file electronically in an electronic computer database stored in the computer system of the third-party data warehouse. The computer system of the third-party data warehouse is configured to receive requests from the second bank at a later time or date, and to forward the data file received from the BOFD to the second bank at that time, either the entire data (including the image) or the MICR data (and the amount, if the amount was not recorded on the check is MICR data) in proper ANSI X9.37 format.

In yet another embodiment of the system, the computer system at the BOFD can scan each check, make an electronic image of the check, retrieve the MICR data from the check, and perform image recognition to determine the amount of the check (again assuming the amount is not embedded in the MICR data).

Example 2

Not Correcting MICR Data at BOFD and Transmitting the Uncorrected MICR Data to the Second Bank for Later Error Correction In this configuration, the BOFD scans the check as described above and determines that there are unreadable or missing characters in the other MICR fields of the check other than the bank routing number and the amount of the check. The computer system at the BOFD creates an ANSI X9.37 file or record of the check that was scanned that is missing one or more characters (i.e., one or more MICR characters are unreadable by the check scanner at the BOFD) in one or more of the account number, serial number, process control field, optional field 4, or optional field 6 fields.

Since the amount and the bank routing number are readable, the computer system at the BOFD knows how much the check is for and to which bank the check should be tendered. The X9.37 standard, however, requires that all of the MICR fields be determined at the BOFD before transmitting that electronic data in ANSI X9.37 format to the second bank (or to either of the data warehouses described above in the first example). In this example, the BOFD transmits an incomplete set of MICR data in the ANSI X9.37 record of the check to the second bank.

The second bank, in turn, receives this incomplete ANSI X9.37 record of the check, and its computer system performs another error check and correction program to determine which of the MICR numbers (if any) can be determined. The computer system at the second bank which receives the ANSI X9.37 data compares each of the five fields which may have missing data with master lists of valid data. For example, if the MICR account number field had one or more unreadable characters, the computer system at the second bank compares the known correct characters in the account number field with the universe of valid account numbers for the second bank. If only a single account number has characters that matches all of the known scanned characters in the MICR data transmitted from the BOFD, the second bank knows that the matching account number is the correct account number for that check. The computer system at the second bank then substitutes the matching account number into the electronic record of the check and processes the check by debiting the account corresponding to the single matching account number by the amount of the check transmitted in the ANSI X9.37 record of that check.

The same process for correcting account number data at the second bank may also be performed on any other partially complete MICR fields transmitted from the BOFD to the second bank. If a character is missing (i.e., unreadable by the BOFD check scanner) from any of the other MICR data, including the transmitted serial number data, the transmitted process control field, the transmitted optional field 4, or the transmitted optional field 6, the same error correction process can be performed using a list of known correct numbers for each of these fields. Instead of comparing the serial number with the known universe of account numbers, however, the computer at the second bank is configured to compare the serial number with missing characters to the universe of valid serial numbers, to compare the process control field with missing characters to the universe of valid process control field numbers, to compare the optional field 4 with missing characters to the universe of valid optional field 4 numbers, and to compare the optional field 6 with missing characters to the universe of valid optional field 6 numbers.

As in the first example, the second bank can receive the ANSI X9.37 data directly from the first bank, or it can receive it from a third-party data warehouse, such as SVPCo, to which the BOFD previously sent the ANSI X.937 data with missing characters. The advantage of sending incomplete ANSI X9.37 data to the second bank, and having the second bank correct the data, is that the second bank need not disclose the significance of the MICR data, how it is calculated, or the master lists of any of its data encoded in MICR form.

Example 3

Correcting Errors Both at the BOFD and at the Second Bank

Finally, it should be clear that both of the above-described error correction processes can be (but do not have to be) performed on any check. For example, the BOFD can correct the bank routing number, leave at least one of the other MICR data fields uncorrected (assuming the check scanner was unable to read them), and transmit this incomplete ANSI X9.37 record to the second bank for further error correction to determine one of the other MICR fields other than the bank routing number and amount fields. Each check that is processed may therefore be corrected at least twice: once at the BOFD, and once at the second bank. Further, it should be clear that any one or all of the MICR fields on the check can have unreadable characters that can be subsequently corrected by either the BOFD or the second bank. Indeed, every single MICR field could have a missing or unreadable character, and the system described above would be able to correct for all of those errors.

It should also be clear that the system described above is not guaranteed to correct for every error—i.e., to identify each and every unreadable MICR character on a check. Clearly, if all of the individual characters that make up any particular MICR field were missing or unreadable, one would be unable to determine what the correct number in that MICR field was. Also, a file sending X9.37 check data from the BOFD to third-parties or the second bank can contain X9.37 records (either full or partial records, per the above description) for many hundreds or thousands of checks. In addition, not every check record sent from the BOFD computer to a third-party computer or to a computer at the second bank as described above need have the identical type or number of incomplete check records. Each X9.37 check record can have different missing/unreadable check MICR data, or even no missing data at all.

Thus, it should be understood that the embodiments and examples have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art. Accordingly, it is intended that the scope of the invention be defined by the claims appended hereto.

What is claimed is:

1. A system for processing documents with data, comprising:
   a controller adapted to receive electronic data retrieved or read from one or more documents, said data comprising one or more numbers, each said number comprising one or more individual characters;
   further wherein the controller is adapted to perform correction of said electronic data by comparing a number in said data that contains one or more failed characters that were not or could not be read or retrieved, or that were improperly or incorrectly read or retrieved, with a plurality of numbers comprising permissible numbers known for such data, wherein said plurality of permissible numbers are from a list of all valid numbers currently in use for that data and are not determined from any historical transaction data and also are not determined from the data retrieved or read from the document being processed, and automatically and electronically replacing said failed characters with corresponding valid characters from one of said permissible numbers.

2. The system of claim 1, wherein said electronic data comply with the ANSI X9.37 standard.

3. The system of claim 1, wherein said file controller is in communication with means for data storage.

4. The system of claim 3, wherein the means for data storage comprises a database.

5. The system of claim 1, wherein some or all of the data received is without qualification.

6. A method for processing documents with data, comprising the steps of: receiving data about one or more documents in electronic format; examining the data to determine if any errors exist in the data; and attempting to correct any errors that have been identified in the data by comparing a number in the received data for the document being processed that contains one or more failed characters that were not or could not be read or retrieved by, or that were improperly or incorrectly read or retrieved by, a document processor, with a plurality of numbers comprising permissible numbers known for such data, wherein said plurality of permissible numbers are from a list of all valid numbers currently in use for that data and are independent of and not derived from any historical transaction data and also are not derived from data retrieved or read from the document being processed, and automatically and electronically replacing said failed characters with corresponding valid characters from one of said permissible numbers.

7. A computer-implemented method for processing transmitted data, comprising the steps of:

receiving in a computer memory electronic data associated with one or more documents;

examining the data associated with a first document to determine if any errors exist in the data;

attempting to correct any errors that have been identified in the data by comparing a number in the data that contains one or more failed characters that are incorrect with a plurality of permissible numbers each including valid characters operable to replace the failed characters, wherein said plurality of permissible numbers are from a list of valid numbers currently in use for that data and are not determined from any historical transaction data and also are not determined from data retrieved or read from the data being processed, and automatically and electronically replacing in a computer memory said failed characters with corresponding valid characters from one of said permissible numbers; and repeating the examining and attempting to correct steps until all data associated with one or more documents have been processed.

8. The system of claim 1, wherein the documents are financial documents.

9. The system of claim 1, wherein the number with one or more failed characters has a first plurality of characters known to be correct and at least one character known to be incorrect or indeterminate.

10. The system of claim 9, wherein the controller is configured to determine all correct numbers from the plurality of permissible numbers that have the first plurality of correct characters.

11. The system of claim 10, wherein the controller is configured to replace all incorrect or indeterminate characters with corresponding characters of the only one correct number, when there is only one number of the plurality of permissible numbers that was determined to be correct.

12. The system of claim 10, wherein the controller is configured to replace a first character of said at least one known incorrect or indeterminate character in a first character position with a replacement character, if all of the permissible correct numbers have said replacement character in respective first character positions of all of said permissible correct numbers.

13. The system of claim 11, wherein the controller is configured to correct the number with one or more failed characters by replacing failed characters in a RAM buffer of the controller.

14. The system of claim 8, wherein the controller is operable to correct numbers with one or more failed characters from at least two data fields on each of the plurality of financial documents by comparing a number from said data fields with a plurality of permissible numbers for each of the data fields, and electronically replacing the number with failed characters with a number from said plurality of permissible numbers.

15. The system of claim 8, wherein the number with failed characters is a bank routing number, and the plurality of permissible numbers comprises valid bank routing numbers.

* * * * *